Figure 1:
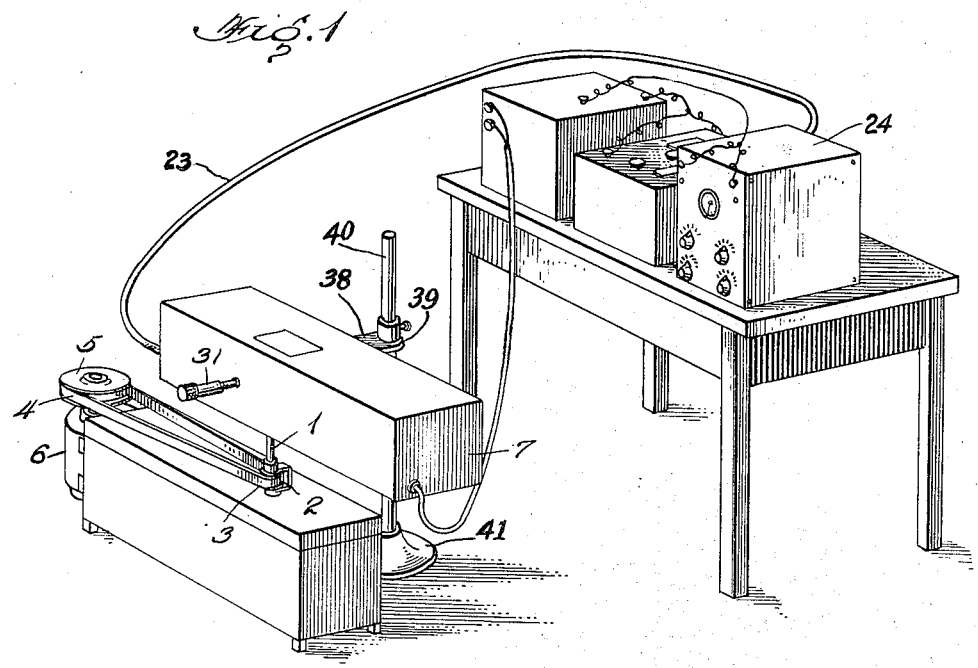

July 21, 1942.                H. J. BURNETT                2,290,606
            APPARATUS FOR MEASURING HIGH SPEED SHAFTS AND SPINDLES
                        Filed Dec. 28, 1939           2 Sheets-Sheet 1

Inventor
Henry J. Burnett
By Earle D. Drummond
Attorney

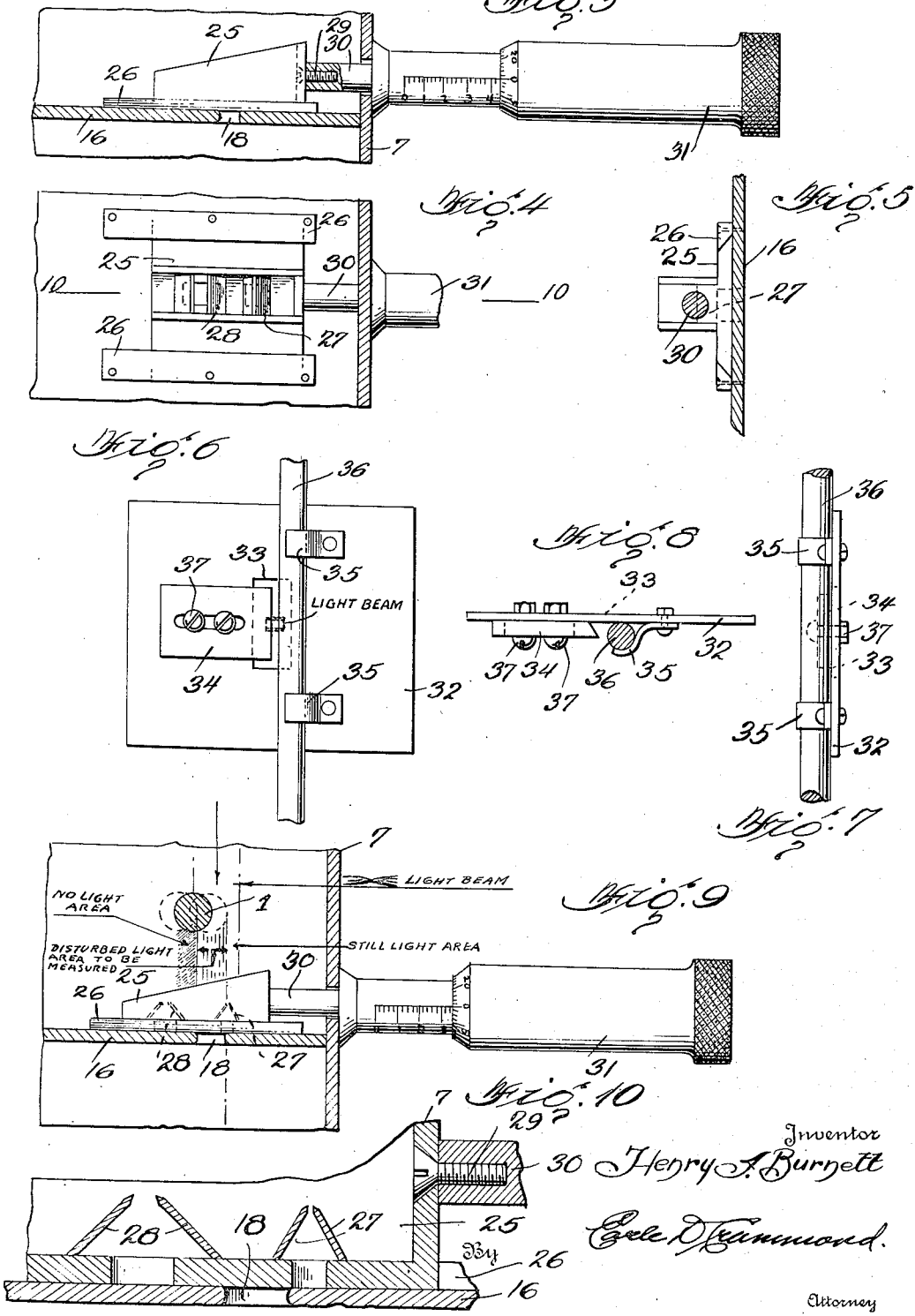

Patented July 21, 1942

2,290,606

UNITED STATES PATENT OFFICE 2,290,606

APPARATUS FOR MEASURING HIGH SPEED SHAFTS AND SPINDLES

Henry J. Burnett, West Brookfield, Mass.

Application December 28, 1939, Serial No. 311,399

6 Claims. (Cl. 73—53)

This invention relates to the measurement of high speed shafts and spindles for deflection or outage. More particularly, the invention pertains to apparatus for measuring deflection or outage of bobbin spindles employed in textile machinery.

Unbalanced shafts or spindles are conducive to abnormal vibration, wear and breakage in machines employing these elements, and more than a normal amount of power is required for operation of machines having spindles or other rotating members showing deflection or outage. Textile machinery in particular utilizes large numbers of bobbin carrying spindles having rotational speeds up to and above ten thousand revolutions per minute. The present invention provides an apparatus for measuring the outage of the spindles to provide for correction of the fault.

When mechanical devices are used to measure the deflection, or outage, of rotating members, the speed of rotation of the member must be limited below the point where the inertia of the parts of the measuring device will cause faulty readings. Since this speed is very low in comparison to the usual operating speeds of the members, it is practically impossible to mechanically measure the outage which may exist in members while normally operating at high speeds. Moreover, if a body having weight is placed in contact with a slender shaft or spindle rotating at high speed both the period of vibration and the amount of deflection will be changed. Hence, if the natural deflection of a shaft or the like is to be correctly measured at high speed, it is necessary to provide a measuring means which avoids weight contact with the shaft.

It is an object of the invention to provide an apparatus for accurately measuring the deflection of shafts and the like at high speeds, and to provide an apparatus using a calibrated light beam as the measuring medium. Further advantages and objects will become apparent as the description progresses.

The apparatus of the invention in a preferred illustrative embodiment will be better understood from the following specification in which reference is had to the accompanying drawings in which like reference numerals represent like parts throughout the several figures, and in which—

Figure 2:
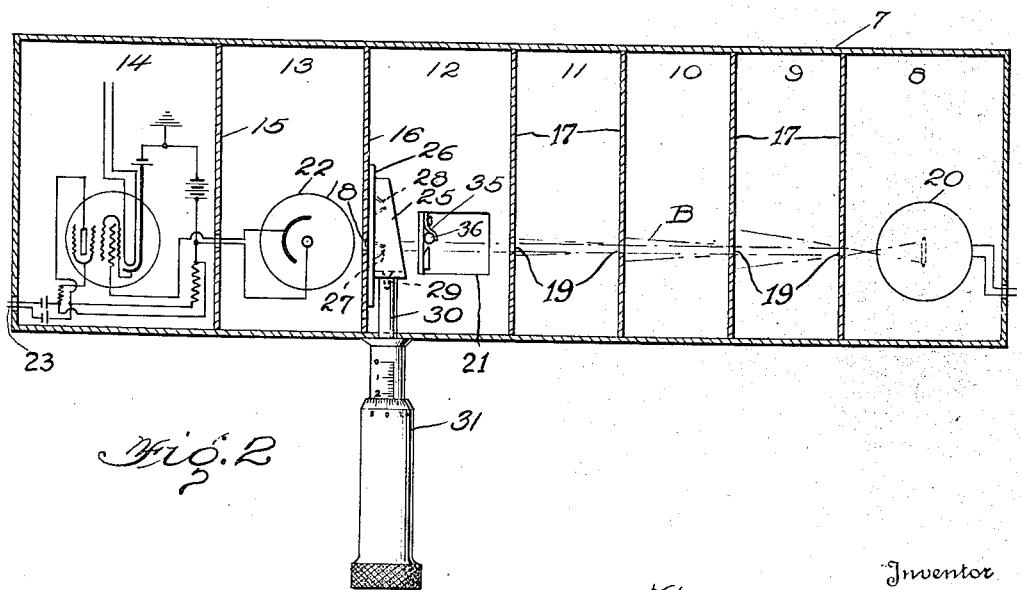

Fig. 1 is a view in perspective showing measuring apparatus embodying the invention; Fig. 2 is a top plan view of the measuring device showing the housing partly in section; Fig. 3 is a side plan view of the micrometer, slide and guides; Fig. 4 is a top plan view of the apertured slide and guide structure of Fig. 3; Fig. 5 is an end view of the support and slide of Fig. 4; Fig. 6 is a front elevation of the light beam calibrating means; Figs. 7 and 8 are side and top plan views of the calibrating means of Fig. 6; and Fig. 9 is a view illustrating the relationship of the light beam, slide and a shaft being tested; Fig. 10 is an enlarged sectional view on line 10—10 of Fig. 4.

In the drawings, the rotatable member 1 to be tested or measured is a standard bobbin carrying spindle used extensively in textile mills. The spindle is mounted for rotation in a conventional support and bearing housing 2 and carries a pulley 3 driven by tape or belt 4 from a pulley 5 shown here for illustrative purposes as mounted on the shaft of motor 6. In actual operation on textile machines these spindles have rotational speeds of several thousand R. P. M. and their state of balance is an important machine operating factor. Correct measurement of spindles at high speed for natural deflection or outage to permit corection of unbalanced conditions has heretofore presented a distinct problem. Reasonable accuracy of measurement of natural deflection of spindles and the like at high speed is accomplished with the measuring device and agencies hereinafter described.

The measuring device is contained in a lighttight rectangular box or housing 7 divided into a series of compartments 8 to 14, inclusive, by shielding partition 15, slide guide support and light screen 16, and the series of light screens 17. Screens 16 and 17 are provided respectively with aligned light slits 18 and 19 forming the only passage for a light beam from an exciting lamp 20 located in compartment 8. The lamp is characterized by having a filament of uniform size and a width exceeding the amount of possible deflection of a rotating element to be tested, said element as illustrated, being the spindle 1 which enters the measuring device housing through aperture 21 in the bottom of the housing to intersect a portion of the light beam.

Compartment 13 contains light sensitive cell 22 which is included as a control factor in a conventional manner in the electrical circuits of a conventional high gain amplifier of the resistance-capacity type in compartment 14, connections between the cell and amplifier extending through the shielding partition. The output from the amplifier may be taken off through the housing by leads 23 for connection with the cathode ray oscillograph 24 or other indicating or recording apparatus. The amplifier and cathode ray oscillograph are not illustrated in detail because such apparatus is well known in the art.

The light slits in the screens are arranged or adjusted to be in line with the lamp filament, the light sensitive cell and light slit 18 in the slide guide support 16 so that light beam B from the lamp passes through the respective light slits to the light sensitive negative plate of the photo-electric cell. The slide guide support carries on the exciter lamp side thereof a slide 25 which is adjustably held in place by slide guides 26 fastened to the supports. The slide 25 has two spaced light slits 27 and 28 of different size through which light can pass when either is brought into the light beam in front of the light slit 18. The slide is connected by screw 29 to the end of the shaft 30 of the micrometer 31 supported on the housing to extend outside of the casing so that by moving the thimble of the micrometer in a rotary fashion the slide is made to move in a plane perpendicular to the light beam B and to the axis of the test spindle 1, which is to be measured for off-center deflection. The spindle is so placed that its periphery intercepts a portion of the light beam B. In the slide 25, slit 27 has an opening of about one thousandth of an inch, and is used to measure the off-center motion of the test shaft at its periphery at any speed. Slit 28 of the slide has an opening exceeding the amount of possible deflection off-center of the test shaft 1, so that the entire off-center motion of the shaft may be studied in the cathode ray oscillograph 24 connected with the amplifier. Because of the small size of slit 18, and the location of slits 27 and 28, both slide slits cannot be used simultaneously. All internal parts except the amplifier compartment are coated with light absorbing paint to prevent reflection of stray rays of light.

Te measuring apparatus may be operated in any position. The micrometer is fixed to the housing with its shaft extending through a hole in the box in order that the operation of the slide may be even and smooth as the thimble of the micrometer is turned. The scale of the micrometer indicates in thousandths of an inch the travel of the slide 25 within the box.

The light beam B is calibrated by mechanism adapted for insertion into the housing through the opening provided to receive a shaft to be tested. This mechanism consists of the calibration plate 32 having light-beam opening 33 and attached calibration slide 34 and shaft clamps 35. A piece of test shaft 36 which is identical in dimension and material to the test shaft 1, the deflection of which is to be measured, is placed under the shaft clamps 35. Calibration slide 34 is adjustable so that the distance between it and the periphery of the piece of test shaft 36 may be measured. This forms a slit of known width and the screws 37 holding calibration slide 34 can be tightened to maintain this known distance. The calibration mechanism is then inserted into the light-tight housing through the opening for shaft 1 so that the piece of test shaft 36 will be in a position where it partially intercepts the light beam B. Because of the opening between the calibration slide 34 and the piece of test shaft 36, the portion of the light beam which passes through the slit member 27 of slide 25, is known. The high-gain amplifier in compartment 14 being capacity-resistance, coupled to the cathode ray oscillograph permits an electrical impulse to pass to the cathode ray oscillograph arrangement, only when there is a dynamic disturbance of light beam B which passes through slit 27 of slide 25 to the sensitive plate of the photo-cell. This is of fundamental importance. The exciting lamp 20 is lighted by constant current to provide a steady light beam and to prevent undesired light impulses from passing to photocell 22 which would tend to cause discrepancies later. With the calibration mechanism in place so that the piece of test shaft 36 is in the identical position where test shaft 1 will be when its deflection is measured, a calibration curve of standard opening between calibration slide 34 and the piece of test shaft, against micrometer 31, readings in thousandths of an inch, is ready to be determined as follows:

The light beam B is interrupted by passing a thin object through it in an oscillatory fashion so that there is a so-called flicker or variation of light intensity repeating itself. The micrometer thimble is turned so that slit 27 of slide is brought into the area of fluctuating light which passes through the known opening between calibration slide 34 and piece of test shaft. The minimum and the maximum points of the travel of slit 27 are recorded from the scale of the micrometer in thousandths of an inch. That is, as slit 27 of slide 25 enters the fluctuating light area of the portion of the light beam that passes through the known opening between the calibration slide and piece of test shaft, the slightest disturbance in the cathode ray oscillograph picture indicates the so-called minimum reading on the micrometer scale. While the light beam B is still being disturbed in front of the calibration mechanism, the thimble of micrometer 31 is turned so that the slit 27 of slide 25 protrudes farther into the light beam passing through the so-called standard opening between the calibration slide and the piece of test shaft. The thimble of the micrometer is moved constantly in the same direction until there is no further disturbance in the cathode ray oscillograph picture. This point is then recorded as a maximum point. The difference between these two readings, the maximum and the minimum, gives the distance of travel in thousandths of an inch of slit 27 of the slide through the disturbed area of light. Since light rays have a tendency to expand, the reading of the micrometer in thousandths of an inch will be greater than the width of the standard opening between the calibration slide, and the piece of test shaft. This is an important feature of the entire method of shaft and deflection measurement. The design in the oscillograph ray tube picture is of no importance in so far as the measurement of deflection itself is concerned. The important thing is to notice at what position on the micrometer scale the cathode ray disturbance begins and the point where it ends as slit 27 of slide 25 is moved through the area of disturbance of the light beam passing through the standard opening of the calibration mechanism.

To increase accuracy several readings are taken on the micrometer scale of maximum and minimum points for the same standard opening in the calibration mechanism. Thus, one point of the calibration curve is obtained by taking the average of the readings obtained for this standard opening. For further points on this calibration curve, a series of readings are taken for different standard openings, the range of which is determined by the anticipated amount of deflection of the test shaft 1 which is to be measured. These readings are averaged and then plotted on graph paper. The more points that are taken, the more reliable the curve.

After a calibration curve is completed, the calibration mechanism is removed from the light-tight box and is replaced by test shaft 1 whose deflection off-center is to be measured in any speed. Test shaft 1 is placed in exactly the same position as the piece of test shaft 36 held during the calibration of the light beam. This tends to eliminate irregularities in the light beam or exciting lamp filament, the slide 25, and the curvature of the photo cell plate. An important feature of this method lies in the fact that with this type of capacity-resistance coupled amplifier between the photo cell and the cathode ray, steady light passing by the test shaft 1 through slit 27 to the sensitive plate of the photo cell 22 produces no disturbance in the cathode ray picture. Test shaft 1 intercepts the light beam B at exactly the same point as did the piece of test shaft 36 of the calibration mechanism, and is rotated at any speed at which its deflection is to be measured. However, the maximum amount of deflection of test shaft 1 must not exceed the width of slit 18 or the possible motion of slide. With test shaft 1 in rotation, there is a minimum and a maximum movement of the periphery of the shaft, although the motion (other than rotation) of the axis of the shaft may be circular or oval. That is, the amount of deflection recorded by the micrometer 31 is at right angles to the longitudinal axis of the beam of light. Under all circumstances, the maximum deflection whether it occurs at every station or not, is indicated by the micrometer. The off-center motion of the rotating test shaft produces an area of disturbance in the beam of light which passes through slit 27 of the slide to the photo cell. Likewise, as in the calibration, maximum and minimum points of deflection are obtained. It is to be remembered that steady light passing through slit 27 to the photo cell produces no disturbance in the cathode ray or oscillograph picture. Therefore, as the thimble of micrometer is turned in one direction, slit 27 of slide 25 moves slowly into the light beam B. There is, at first, no disturbance in the cathode ray oscillograph picture, as indicated in the previous statement. But as slit 27 of the slide moves into the area of light beam disturbance caused by the deflection of test shaft perpendicularly to the light beam, there will be a disturbance in the cathode ray oscillograph picture. This represents the minimum point of deflection and the reading on the micrometer scale is recorded. With the same motion of micrometer slit 27 of slide 25 is moved across the area of disturbance in the light beam caused by the deflection of test shaft 1. At this point there is no disturbance in the cathode ray oscillograph picture, and this point is recorded from the micrometer scale as the maximum point of shaft deflection. Again, it is important to note in the capacity-resistance coupled amplifier steady light on the photo cell produces the same effect as no light on the photo cell. In other words, steady light and no light represent static conditions in which there is no output from the high gain amplifier. To increase accuracy, several readings at this same point on the test shaft 1 are taken. Again, the difference between the minimum and the maximum readings on the micrometer scale represents the distance of travel of slit 27 of slide 25 as it passes through the disturbance of the light beam, caused by the resulting off-center motion of the test shaft 1 perpendicular to the light beam. After several of these readings are taken and averaged, the resulting figure, representing the travel of slit 27 of slide 25 is referred to the calibration curve to obtain the equivalent standard opening which would have given the same slit 27 travel in thousandths of an inch, as recorded on the micrometer scale. Test shaft 1 may be operated at various speeds at the same point to determine how the deflection of test shaft 1 at a given point may vary with the speed of the shaft, and the light-tight housing may be moved in a direction parallel to the axis of the shaft, as for example in an arrangement as shown in Fig. 1, to determine the deflection at any point along its length at any given speed.

The apparatus is portable, and in one arrangement as shown in Fig. 1, the measuring device is supported over the spindle to be tested by a bracket 38 having a central bearing guide and clamping member 39 which is vertically adjustable along standard 40 on base 41. In this arrangement, connection is made from the amplifier unit to the cathode ray oscillograph as an individual unit movable with respect to the measuring device for observation convenience. While the measuring device is shown movable with respect to the shaft to secure measurement at all points along the shaft, such measurement may also be effected by suitable movement of the shaft in relation to the device. The shaft may be made to intersect the light beam in the manner shown in Fig. 9. Therein it will be noticed that the normal calibrated light beam is divided into a shadow portion, a still light portion and an intermediate portion which is determined by the deflection of the shaft as diagrammatically indicated by the dotted lines. The micrometer slide and light slit traversing the beam is adapted to give accurate measurement of any portion of the light beam and the intermediate disturbed portion is that utilized to measure the deflection of the shaft.

The cathode ray oscillograph may be moved into convenient position for observation and it gives instantaneous pictures of what is occurring during any part of a deflection cycle. Close observation of the oscillograms affords opportunity of obtaining information concerning harmonic frequencies in the spindle action at any speeds as direct means of determining the cause of poor spindle operation and excessive bearing wear, etc.

While the invention has been described in connection with a specific embodiment thereof, it is to be understood that the words which have been used are words of description rather than of limitation, and that practice of the invention within the scope of the appended claims may be resorted to without departing from the true scope and spirit of the invention in all its aspects.

I claim:

1. In a measuring apparatus for shafts and the like, a light sensitive cell, means influenced by the cell for indicating characteristics of light received by the cell, a source of light spaced from the cell, a plurality of spaced light screens apertured in alignment with the source of light and the cell for passage of a beam of light from the source to the cell, means for supporting a shaft or the like perpendicular to the light beam to intersect a portion of the beam, and micrometer means having a slide with a light slit therein mounted for movement transversely in the light beam between a shaft intersecting the beam and the cell to measure and indicate the amount of disturbance of the beam by the shaft.

2. In apparatus for measuring deflection of a shaft and the like, an elongated light-tight housing having an opening intermediate its ends to receive within the housing a shaft to be measured, a lamp at one end of the housing, a photoelectric cell adjacent the other end of the housing, an amplifier of the resistance-capacity type having said cell included in its circuit, a plurality of spaced light screens having light slits in alignment with said lamp and cell, slide guides mounted on one of said light screens in front of said cell, a slide mounted in said guides and having a light slit therein movable across the light slit in the screen to control and measure portions of the light beam normally passing through the screen slit to the cell, and a micrometer for moving and measuring the extent of movement of said slide traversing the light beam.

3. In measuring apparatus of the character described comprising, a light-tight housing apertured to receive transversely thereof a shaft to be measured, a lamp within the housing near one end, a plurality of spaced light screens having light slits in alignment with the lamp for passage of a beam of light from said lamp, a slide with a light slit therein mounted on one of said light screens to move across the light slit in the screen, a micrometer for moving and measuring the movement of said slide, a photoelectric cell for receiving said light beam, and means for indicating varying characteristics of the light beam received by said cell.

4. In measuring apparatus of the character described comprising, a light-tight housing apertured to receive transversely thereof a shaft to be measured, a lamp within the housing near one end, a plurality of spaced light screens having light slits in alignment with the lamp, for passage of a beam of light from said lamp, a slide with a light slit therein mounted on one of said light screens to move across the light slit in the screen, a micrometer for moving and measuring the movement of said slide, a photoelectric cell for receiving said light beam, an amplifier of the resistance-capacity type having its circuit including therein said cell, and a cathode ray oscillograph connected with said amplifier for detection of disturbances in the light beam.

5. In measuring apparatus of the character described comprising, a light-tight housing apertured to receive transversely thereof a shaft to be measured, a lamp within the housing near one end, a plurality of spaced light screens having light slits in alignment with the lamp for passage of a beam of light from said lamp, a slide with a light slit therein mounted on one of said light screens to move across the light slit in the screen, a micrometer for moving and measuring the movement of said slide, a photoelectric cell for receiving said light beam, an amplifier of the resistance-capacity type having its circuit including therein said cell, a cathode ray oscillograph connected with said amplifier for detection of disturbances in the light beam by a shaft disposed in the housing perpendicular to and intersecting a portion of the light beam, and means for supporting and rotating said shaft in the light beam according to its normal operation when in use.

6. In measuring apparatus of the character described comprising, a light-tight housing apertured to receive transversely thereof a shaft to be measured, a lamp within the housing near one end, a plurality of spaced light screens having light slits in alignment with the lamp for passage of a beam of light from said lamp, a slide with a light slit therein mounted on one of said light screens to move across the light slit in the screen, a micrometer for moving and measuring the movement of said slide, a photoelectric cell for receiving said light beam, an amplifier of the resistance-capacity type having its circuit including therein said cell, a cathode ray oscillograph connected with said amplifier for detection of disturbances in the light beam by a shaft disposed in the housing perpendicular to and intersecting a portion of the light beam, means for supporting and rotating said shaft in the light beam according to its normal operation when in use, and means whereby said shaft may be made to traverse said light beam throughout the length of the shaft to permit deflection measurement of the entire shaft.

HENRY J. BURNETT.